J. BLUE.
PLANTER.
APPLICATION FILED SEPT. 19, 1919.
1,393,744.
Patented Oct. 18, 1921.
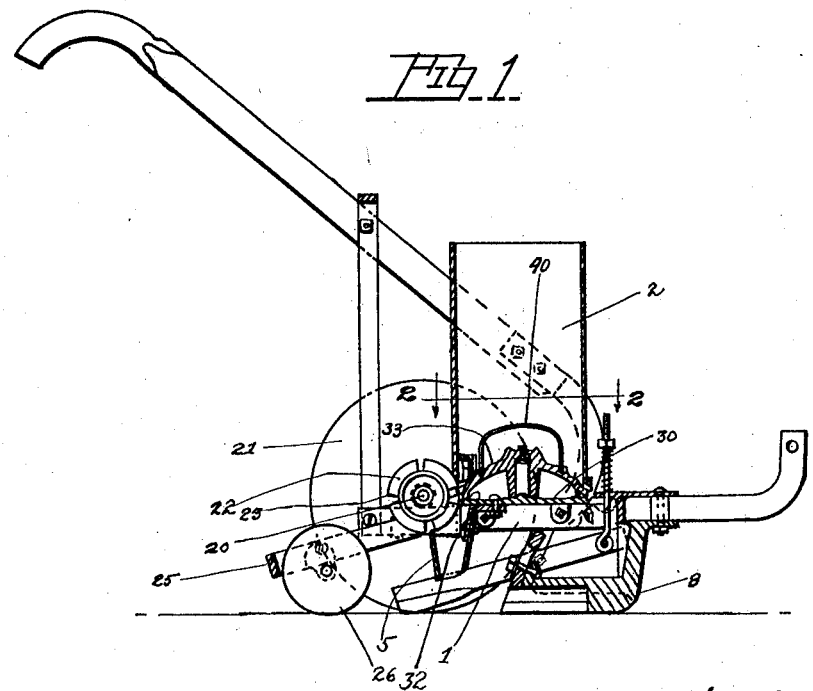
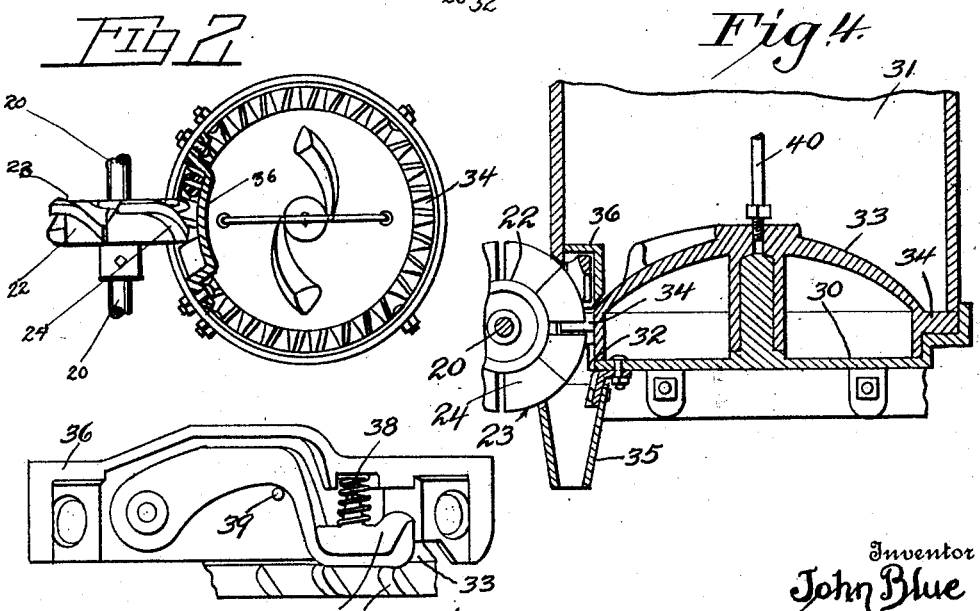
Inventor
John Blue
Witness
By C. A. Snow & Co.
Attorneys

UNITED STATES PATENT OFFICE.

JOHN BLUE, OF LAURINBURG, NORTH CAROLINA.

PLANTER.

1,393,744.     Specification of Letters Patent.     Patented Oct. 18, 1921.

Application filed September 19, 1919. Serial No. 324,918.

*To all whom it may concern:*

Be it known that I, JOHN BLUE, a citizen of the United States, residing at Laurinburg, in the county of Scotland and State of North Carolina, have invented a new and useful Planter, of which the following is a specification.

This invention relates to planters and is more especially a division of an application filed by me on Oct. 11th, 1918, Serial Number 257,724.

One of the objects of the invention is to provide a novel form of agitator in the seed box and to provide a gate of improved construction which allows the escape only of those seeds contained between the teeth of the feed plate, there being yielding means for holding the gate in place so as to prevent seeds from being wedged beneath and cracked by the cut-off gate.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a section through a planter having the present improvements.

Fig. 2 is an enlarged section on line 2—2, Fig. 1.

Fig. 3 is an elevation of the cut-off gate and its housing.

Fig. 4 is an enlarged section through the bottom of the feed box and through the feed dropping mechanism, parts being broken away.

Referring to the figures by characters of reference 1 designates the frame of a planter having a furrow opener 8 thereunder together with covering blades 16 and a smoothing roller 26.

A wheel supported shaft 20 is journaled on the frame and has an actuating wheel 22 secured thereto and provided with peripheral wings 23 having oblique portions 24.

Mounted on and secured to the sides 1 of the frame of the planter is the bottom plate 30 of the seed hopper 31. A seed outlet 32 is provided in the rear portion of the bottom of the hopper and a substantially conical dropping plate 33 is mounted for rotation on the bottom of the hopper and has peripheral teeth 34 forming seed cells therebetween. These teeth are adapted to be engaged by the wings 23 of the wheel 22 so that, as said wheel rotates during the forward movement of the machine, the wings will enter the seed cells, eject downwardly the seeds contained therein, and rotate the plate 33 intermittently as disclosed in my patent hereinbefore mentioned. A boot 35 is secured to the bottom of the hopper so as to receive the ejected seeds and direct them in the furrow formed by opener 8.

A small housing 36 is secured to the inner surface of the wall of the hopper directly over the seed outlet and pivotally mounted in the housing is a cut-off gate 37 having a spring 38 for pressing it downwardly toward the toothed portion of the dropping plate. This spring will allow the gate to lift when a seed is forced thereunder, without splitting or crushing the seed. A stop lug 39 limits the downward movement of the gate and holds it out of contact with the dropping plate, thus materially reducing friction.

The seeds in the hopper 31 are prevented from bridging by providing an agitating bail 40 upstanding from the plate 33.

What is claimed is:—

In a planter the combination with a seed hopper having an outlet, a seed plate mounted for rotation in the hopper and having peripheral cells movable to the outlet, and means movable downwardly through the cells successively to eject seeds and to impart an intermittent rotation to the plate, of a housing secured to the hopper and extending over those cells above and adjacent the outlet, the inner wall of the housing being adjacent the cells and concentric with the plate, a cut-off gate pivotally mounted at one end within the housing, a spring engaging the other end portion of the gate for holding said end portion yieldingly in contact with the seed plate, and means on the housing for limiting the downward movement of the gate under the action of the spring.

In testimony that I claim the foregoing as my own, I have hereto affixed my signature in the presence of two witnesses.

JOHN BLUE.

Witnesses:
C. L. McCoy,
M. Beverly.